Patented Sept. 15, 1931

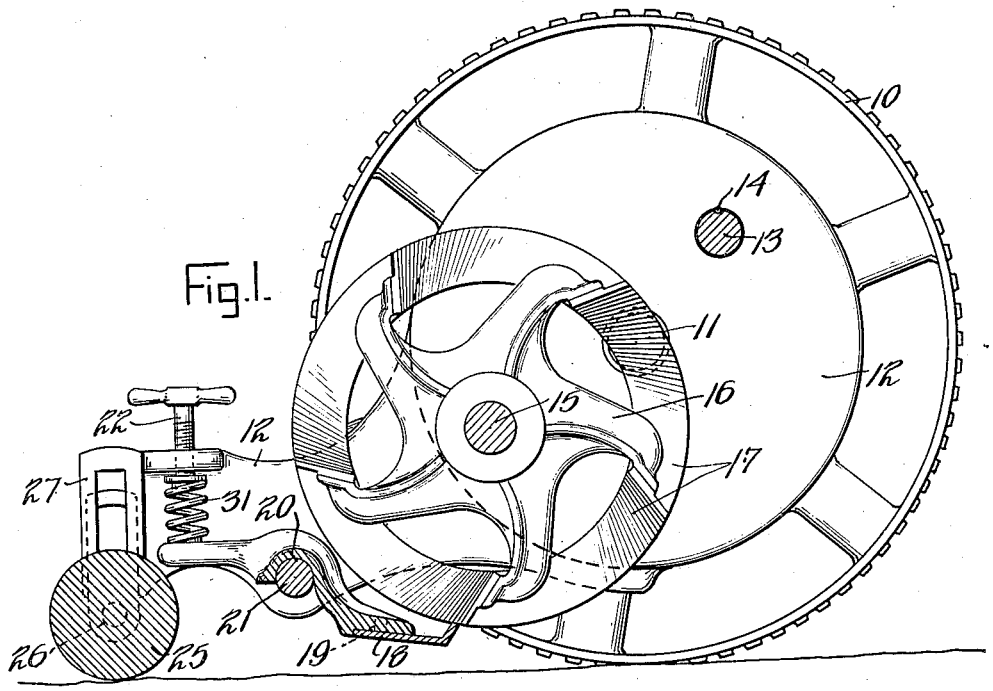
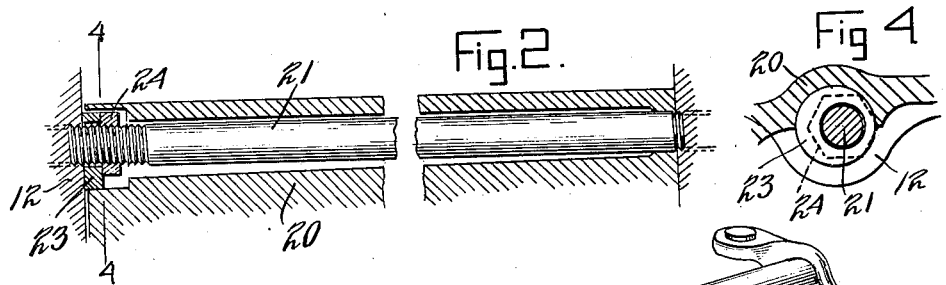
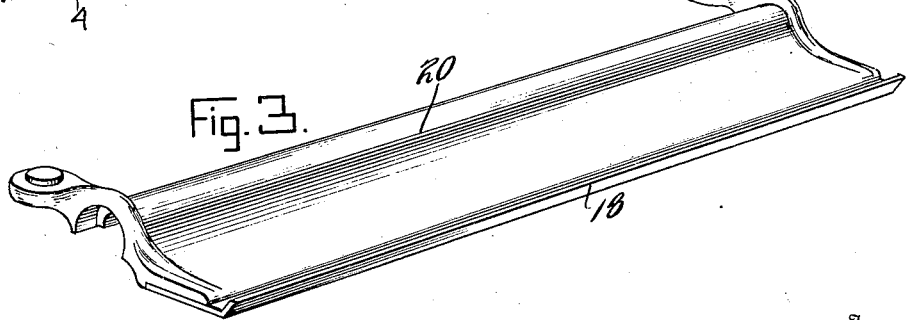

1,823,821

UNITED STATES PATENT OFFICE

HERBERT A. DAUM, OF INDIANAPOLIS, INDIANA

LAWN MOWER

Application filed February 10, 1926. Serial No. 87,344.

My said invention relates to a lawn mower and consists in various improvements in the details of construction and arrangement of parts, whereby various advantages are secured in the operation of the machine, all as will be hereinafter more fully described and claimed.

Referring to the accompanying drawings which are made a part hereof and on which similar reference characters indicate similar parts, Figure 1 is a longitudinally vertical section of a portion of a lawn mower embodying my invention, Figure 2 is a detail sectional view on the line of rod 21, Figure 3 is a perspective of the knife bar, and Figure 4 is a section on the line 4—4 of Fig. 2.

In said drawings the part marked 10 indicates one of a pair of driving wheels which are mounted upon stub axles 11. The said axles 11 are supported in a frame comprising a pair of side plates 12 only one of which is shown having rearwardly extending arms, and braces 13 and 21 for holding the side plates in proper spaced relation. The brace 13 is preferably secured in receiving openings in the side plates by means of keys 14 to insure rigidity of the frame. The brace rod 21 is also preferably likewise secured in the rearwardly extending portions of the side plates 12.

A shaft 15 is supported in appropriate manner at its respective ends in the side plates and a reel 16 having preferably five spirally-shaped blades 17 is rotatably mounted upon said shaft. The reel 16 is driven from the driving wheels 10 by the usual gear or any appropriate driving connection so that it will revolve upon the rotation of the driving wheels as the device is propelled. A knife 18 is secured by means of screws 19 to a knife-bar 20 which is mounted to rock on the brace rod 21. Said knife 18 has its forward edge upturned for cooperation with the spiral blades on the reel. It is desirable at all times for the knife 18 to be in contact with one or more of the spiral blades on the revolving reel in order that the operation may be smooth and continuous and in order to accomplish this result I mount a pair of springs 31 in position to engage the upper surface of the knife bar adjacent its rear edge which will tend to force the rear edge of the knife bar downwardly and the front edge carrying the knife upwardly and keep said knife in engagement with one of the spiral blades of the reel at all times. Each spring is provided with an adjusting screw 22 which is mounted in an ear 28 formed on the rearwardly extending part of the side plate, thus providing means for equalizing and regulating the tension of the springs and the pressure of the lower knife 18 upon the spiral blades 17. In order to provide for the adjustment of the knife 18 to secure accurate alignment with the blades 17, I provide a recess in one end of bar 20 about one end of the rod 21 and mount an eccentric roller 23 on said rod within said recess. A lock nut 24 is provided for securing the parts. By adjusting the eccentric roller by loosening said lock-nut, turning said roller, and when in proper position, again tightening said lock-nut, the adjacent end of the knife bar and knife will be caused to approach or recede from the corresponding end of the supporting bar to secure the proper adjustment.

A roller 25 is adjustably mounted on a shaft 26 vertically supported by brackets 27 on the rearwardly extending portions of the side plates, and said roller forms a support for the rear part of the machine as is usual in this type of device.

From the foregoing it will be understood that a lawn mower is provided in which the side members of the frame are held in proper spaced relation by cross braces or rods, one of which forms a mounting for the stationary knife, and a reel with five spiral blades is mounted to co-act with said knife; the five spiral blades insuring the continuous and uniform contact between the reel blades and the stationary knife.

In operation, as the lawn mower is propelled power will be transmitted from the driving wheels to the reel and cause the same to revolve. During the rotation of the reel one of the five knives thereon will be continuously in contact with the stationary knife and will prevent the stationary knife from tipping under the action of the springs 31, thus maintaining a constant and uniform shearing contact. On account of the continuous contact between the revolving knives on the reel and the lower knife the said knives will also be maintained in a sharp condition and the necessity of re-sharpening will be practically, if not entirely, eliminated.

It will be obvious that various changes may be made in my device without departing from the spirit of the invention and therefore I do not limit myself to what is shown in the drawings and described in the specification except as indicated in the appended claims.

Having thus fully described my said invention, what I claim as new and desire to secure by Letters Patent, is:

1. In a lawn mower a frame, brace rods connecting opposite sides of the frame for supporting it, a reel rotatably mounted in the frame, the reel having spiral cutting blades mounted thereon, a cutter bar pivoted on one of the said brace rods, and a spring engaging a portion of the frame and a portion of the cutter bar to hold the cutter bar at all times in engagement with at least one of the spiral blades only, substantially as set forth.

2. In a lawn mower a frame, a reel rotatably mounted in the frame having spiral connecting blades mounted thereon, a cutter bar pivotally mounted on the frame, a spring positioned to engage a portion of the frame and a portion of the cutter bar to swing the cutter bar to hold one cutting edge in constant engagement with the spiral blades, the bar being free to move toward the blades to compensate for wear on the edge of the blades only, substantially as set forth.

In witness whereof, I have hereunto set my hand at Indianapolis, Indiana, this 8th day of February, A. D. nineteen hundred and twenty-six.

HERBERT A. DAUM.